United States Patent
Lin

(10) Patent No.: US 9,900,717 B2
(45) Date of Patent: Feb. 20, 2018

(54) THERMAL PROTECTING DEVICE OF SPEAKER

(71) Applicant: ASUSTeK COMPUTER INC., Taipei (TW)

(72) Inventor: Wen-Hung Lin, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/336,828

(22) Filed: Oct. 28, 2016

(65) Prior Publication Data

US 2017/0127205 A1 May 4, 2017

(30) Foreign Application Priority Data

Nov. 3, 2015 (TW) .............................. 104136123 A

(51) Int. Cl.
| | |
|---|---|
| *H03G 11/00* | (2006.01) |
| *H04R 29/00* | (2006.01) |
| *H04R 3/00* | (2006.01) |
| *G01K 7/24* | (2006.01) |

(52) U.S. Cl.
CPC ............ *H04R 29/001* (2013.01); *G01K 7/24* (2013.01); *G01K 7/245* (2013.01); *H04R 3/007* (2013.01)

(58) Field of Classification Search
None
See application file for complete search history.

(56) References Cited

U.S. PATENT DOCUMENTS

| | | | | |
|---|---|---|---|---|
| 4,207,538 A | * | 6/1980 | Goel ....................... | H03F 1/306 330/277 |
| 4,944,020 A | * | 7/1990 | Noro ....................... | H04R 3/002 381/96 |
| 2012/0033820 A1 | * | 2/2012 | Wang ..................... | H04R 3/007 381/55 |
| 2012/0140932 A1 | * | 6/2012 | Tang ...................... | H04R 3/007 381/55 |
| 2015/0102724 A1 | * | 4/2015 | Lenk .................. | H05B 33/0815 315/112 |

FOREIGN PATENT DOCUMENTS

| | | |
|---|---|---|
| CN | 1477471 | 2/2004 |
| CN | 203206448 | 9/2013 |
| CN | 204442295 | 7/2015 |

OTHER PUBLICATIONS

English translation of CN1477471A.*

* cited by examiner

*Primary Examiner* — Joseph Saunders, Jr.
*Assistant Examiner* — James Mooney
(74) *Attorney, Agent, or Firm* — JCIPRNET

(57) ABSTRACT

A thermal protecting device of a speaker is provided. The thermal protecting device includes an amplifier and a temperature detecting unit. An input end of the amplifier receives an audio reference signal, an output end of the amplifier provides an audio output signal to the speaker. The temperature detecting unit receives an audio input signal to provide the audio reference signal, and detects an operation temperature of the speaker to determine an amplitude of the audio reference signal. The amplitude is inversely proportional to the operation temperature.

9 Claims, 2 Drawing Sheets

THERMAL PROTECTING DEVICE OF SPEAKER

CROSS-REFERENCE TO RELATED APPLICATION

This application claims the priority benefit of Taiwan application serial No. 104136123, filed on Nov. 3, 2015. The entirety of the above-mentioned patent application is hereby incorporated by references herein and made a part of specification.

BACKGROUND OF THE INVENTION

Field of the Invention

The invention relates to a speaker.

Description of the Related Art

With the technology development, various electronic devices for personal entertainment or communication are launched, such as a notebook, a personal computer (PC), a mobile phone and a personal digital assistant (PDA). Usually, a current multimedia electronic device is equipped with a display and a speaker to provide visual and auditory information. Since the multimedia electronic devices are configured to be light, thin and small, an accommodation space for the speaker and a radiation space is compressed. Therefore, when the speaker works and generates heat continuously, it is possible that the speaker is overheated to burn out itself.

BRIEF SUMMARY OF THE INVENTION

According to an aspect of the present disclosure, a thermal protecting device of a speaker, includes: an amplifier, having an input end which is receiving an audio reference signal, and an output end which is providing an audio output signal to a speaker; and a temperature detecting unit receiving an audio input signal to provide the audio reference signal, and detecting an operation temperature of the speaker to determine an amplitude of the audio reference signal, wherein the amplitude is inversely proportional to the operation temperature.

In sum, in embodiments of the thermal protecting device of the speaker, the temperature detecting unit determines the amplitude of the audio reference signal according to the operation temperature of the speaker to avoid the overheating of the speaker.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1:
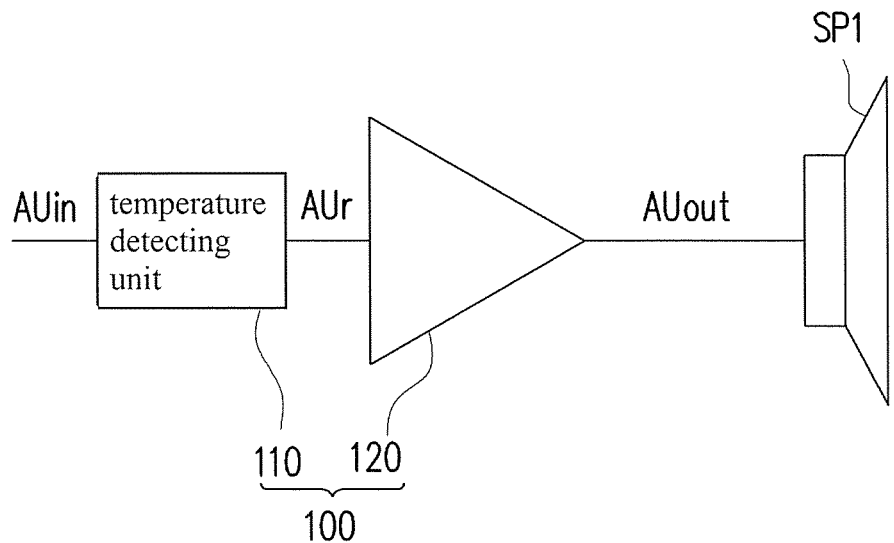
FIG. 1 is a schematic diagram showing a thermal protecting device of a speaker in an embodiment.

FIG. 1 is a schematic diagram showing a thermal protecting device of a speaker in an embodiment. Referring to FIG. 1, in the embodiment, a thermal protecting device 100 of a speaker SP1 includes a temperature detecting unit 110 and an amplifier 120. The temperature detecting unit 110 receives an audio input signal AUin to provide an audio reference signal AUr. The temperature detecting unit 110 detects an operation temperature of the speaker SP1 to determine an amplitude of the audio reference signal AUr. In the embodiment, the amplitude of the audio reference signal AUr is inversely proportional to the operation temperature of the speaker SP1. The input end of the amplifier 120 receives the audio reference signal AUr. The output end of the amplifier 120 provides an audio output signal AUout to the speaker SP1 for driving the speaker SP1 to output a sound. In the embodiment, the amplifier 120 uses a fixed magnification.

In the embodiment, the temperature detecting unit 110 increases an attenuation ratio of the audio input signal AUin when the operation temperature of the speaker SP1 increases. That is, the amplitude of the audio reference signal AUr transmitted to the amplifier 120 becomes smaller, and thus the output power for the audio output signal AUout is reduced. Consequently, a current flowing through the speaker SP1 is also reduced and the operation temperature of the speaker SP1 is lowered. In the embodiment, when the operation temperature of the speaker SP1 is decreased to a safe range, the attenuation of the audio input signal AUin received by the temperature detecting unit 110 is restored to a default value. Then, the output power for the audio output signal AUout is restored to be the maximum, and a default volume sound is provided by the speaker SP1.

Figure 2:
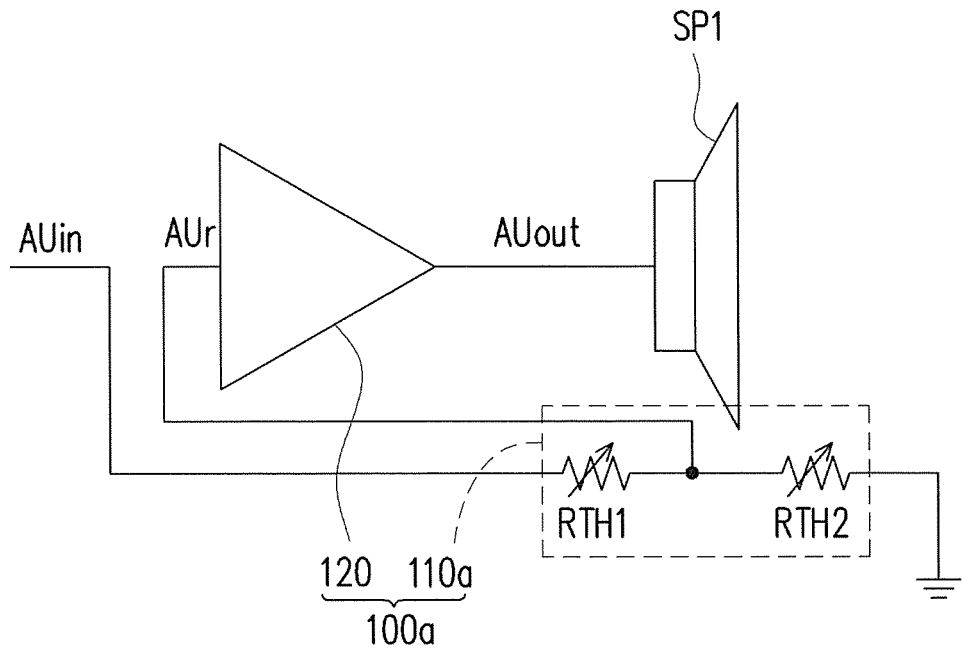
FIG. 2 is a schematic diagram showing a circuit of a thermal protecting device of a speaker in an embodiment.

FIG. 2 is a schematic diagram showing a circuit in a thermal protecting device of a speaker in an embodiment. Referring to FIG. 1 and FIG. 2, in the embodiment, the temperature detecting unit 110a includes a first thermistor RTH1 and a second thermistor RTH2. Other components of the thermal protecting device 100a are similar to that of the thermal protecting device 100 described above. A first end of the first thermistor RTH1 receives an audio input signal AUin. A second end of the first thermistor RTH1 provides an audio reference signal AUr. The second thermistor RTH2 is coupled between the second end of the first thermistor RTH1 and a reference voltage (for example, a ground voltage in the embodiment).

In an embodiment, the first thermistor RTH1 is a positive temperature coefficient thermistor, and the second thermistor RTH2 is a negative temperature coefficient thermistor. When the operation temperature of the speaker SP1 increases, the resistance value of the first thermistor RTH1 increases. And, the resistance value of the second thermistor RTH2 decreases. Thus, a divider coefficient of the first thermistor RTH1 and the second thermistor RTH2 is decreased. In the embodiment, the first thermistor RTH1 and the second thermistor RTH2 are coils which are close to the speaker SP1. Therefore, the first thermistor RTH1 and the second thermistor RTH2 are capable of detecting the operation temperature of the speaker SP1.

Figure 3:
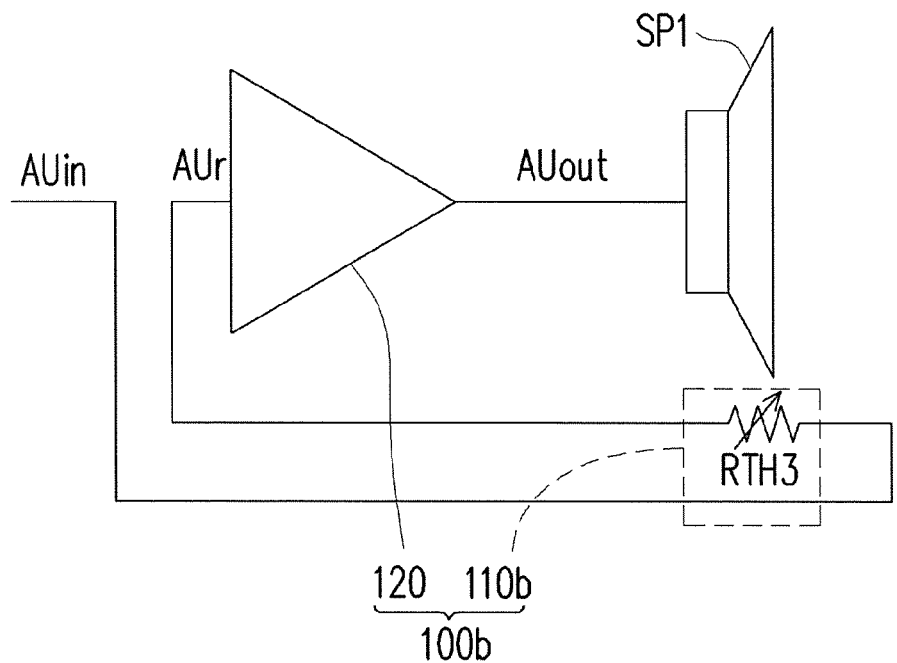
FIG. 3 is a schematic diagram showing a circuit of a thermal protecting device of a speaker in an embodiment.

FIG. 3 is a schematic diagram showing a circuit in a thermal protecting device of a speaker in an embodiment. Referring to FIG. 1 and FIG. 3, in the embodiment, the temperature detecting unit 110b includes a third thermistor RTH3. Other components of the thermal protecting device 100b are similar to that of the thermal protecting device 100 described above. A first end of the third thermistor RTH3 receives an audio input signal AUin, a second end of the third thermistor RTH3 provides an audio reference signal AUr. In the embodiment, the third thermistor RTH3 is a positive temperature coefficient thermistor. When the operation temperature of the speaker SP1 increases, the resistance value of the third thermistor RTH3 increases. Therefore, an attenuation ratio of the audio input signal AUin increases after passes through the third thermistor RTH3. In the embodiment, the third thermistor RTH3 is a coil which is close to the speaker SP1. Therefore, the third thermistor RTH3 is capable of detecting the operation temperature of the speaker SP1.

Figure 4:
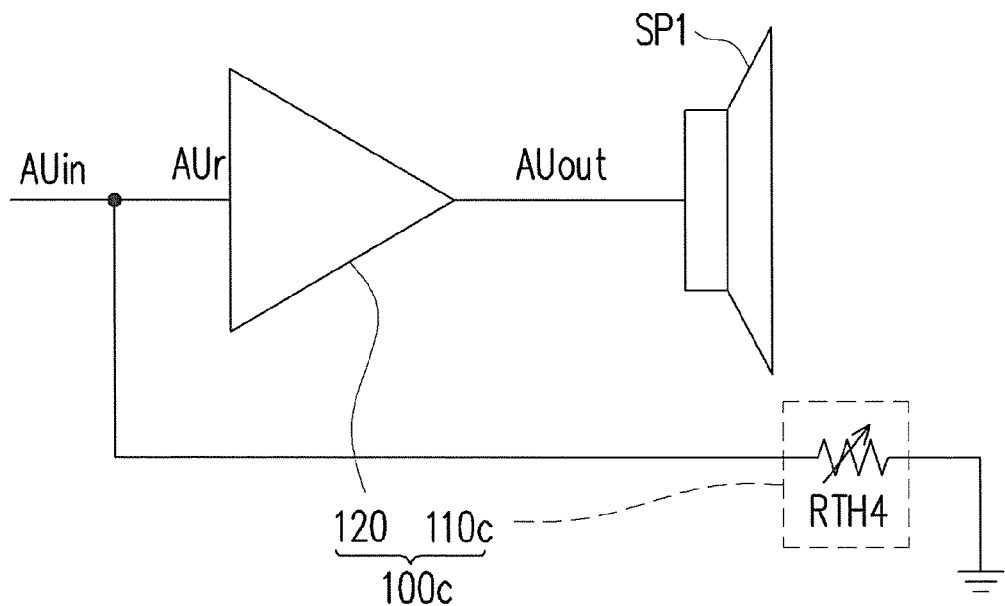
FIG. 4 is a schematic diagram showing a circuit of a thermal protecting device of a speaker in an embodiment.

FIG. 4 is a schematic diagram showing a circuit in a thermal protecting device of a speaker in an embodiment. Referring to FIG. 1 and FIG. 4, in the embodiment, the temperature detecting unit 110c includes a fourth thermistor RTH4. Other components of the thermal protecting device 100c are similar to that of the thermal protecting device 100 described above. A first end of the fourth thermistor RTH4 receives an audio input signal AUin and provides an audio reference signal AUr. The second end of the fourth thermistor RTH4 receives a reference voltage (for example, a ground voltage in the embodiment). In the embodiment, equivalent input impedances of the amplifier 120 and the fourth thermistor RTH4 are considered to be connected parallelly. In the embodiment, the fourth thermistor RTH4 is a negative temperature coefficient thermistor. When the operation temperature of the speaker SP1 increases, the resistance value of the fourth thermistor RTH4 decreases, and an attenuation ratio of the audio input signal AUin increases. In the embodiment, the fourth thermistor RTH4 is a coil which is close to the speaker SP1. Therefore, the fourth thermistor RTH4 is capable of detecting the operation temperature of the speaker SP1.

In sum, in the thermal protecting device of the speaker in the embodiments, the temperature detecting unit determines an attenuation ratio of the audio input signal according to the operation temperature of the speaker. Thus the speaker burned out due to overheated is avoid. Furthermore, in the embodiments, with the configuration of the amplifier, a power larger than the rated power of the speaker is utilized to drive the speaker. Then a high volume sound is provided from the speaker. Moreover, the thermistor of the temperature detecting unit is disposed at the input end of the amplifier, rather than the output end of the amplifier, therefore, the thermistor would not be burned out due to a large current. Additionally, in the embodiments, the thermistor is utilized as a temperature detecting unit for the speaker. In the configuration, a smart amplifier which using a digital signal processor for processing complex temperature calculations is saved. Therefore, the cost of the speaker with the thermal protecting device is reduced. On the other hand, the smart amplifier generally detects a driving voltage of the audio output signal and a driving power for the speaker to reckon the operation temperature of the speaker. That is, the conventional smart amplifier should pre-establish an accurate model for determining the operation temperature of the speaker according to the detected driving voltage and driving power of the audio output signal. However, in the embodiments, the temperature detecting unit detects the operation temperature of the speaker via the thermistor directly, which simplifies the electronic circuit of the speaker.

Although the invention includes been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A thermal protecting device of a speaker, including:
   an amplifier, having an input end which is receiving an audio reference signal and an output end which is providing an audio output signal to the speaker; and
   a temperature detecting unit receiving an audio input signal to provide the audio reference signal, and detecting an operation temperature of the speaker to determine an amplitude of the audio reference signal, wherein the amplitude is inversely proportional to the operation temperature.

2. The thermal protecting device of the speaker according to claim 1, wherein the temperature detecting unit includes:
   a first thermistor, having a first end which is receiving the audio input signal and a second end which is providing the audio reference signal; and
   a second thermistor coupled between the second end of the first thermistor and a reference voltage.

3. The thermal protecting device of the speaker according to claim 2, wherein the first thermistor is a positive temperature coefficient thermistor, and the second thermistor is a negative temperature coefficient thermistor.

4. The thermal protecting device of the speaker according to claim 2, wherein the reference voltage is a ground voltage.

5. The thermal protecting device of the speaker according to claim 1, wherein the temperature detecting unit includes:
   a third thermistor, having a first end which is receiving the audio input signal and a second end which is providing the audio reference signal.

6. The thermal protecting device of the speaker according to claim 5, wherein the third thermistor is a positive temperature coefficient thermistor.

7. The thermal protecting device of the speaker according to claim 1, wherein the temperature detecting unit includes:
   a fourth thermistor, having a first end which is receiving the audio input signal and providing the audio reference signal, and a second end which is receiving a reference voltage.

8. The thermal protecting device of the speaker according to claim 7, wherein the fourth thermistor is a negative temperature coefficient thermistor.

9. The thermal protecting device of the speaker according to claim 7, wherein the reference voltage is a ground voltage.

* * * * *